US012695641B2

(12) United States Patent
Padebettu et al.

(10) Patent No.: US 12,695,641 B2
(45) Date of Patent: Jul. 28, 2026

(54) NETWORK CONFIGURATION INFORMATION PACKET FLOW OPTIMIZATION FOR A DEVICE ASSOCIATED WITH A PHYSICAL OPTICAL LINE TERMINAL (pOLT) AND A DISAGGREGATED BROADBAND NETWORK GATEWAY USER PLANE (DBNG-UP)

(71) Applicant: Juniper Networks, Inc., Sunnyvale, CA (US)

(72) Inventors: Venkatesh Padebettu, Bangalore (IN); John Gibbons, Ashland, MA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 462 days.

(21) Appl. No.: 18/327,482

(22) Filed: Jun. 1, 2023

(65) Prior Publication Data

US 2024/0406025 A1 Dec. 5, 2024

(51) Int. Cl.
*H04L 12/28* (2006.01)
*H04L 61/5014* (2022.01)
(Continued)

(52) U.S. Cl.
CPC ...... *H04L 12/2859* (2013.01); *H04L 61/5014* (2022.05); *H04L 69/22* (2013.01);
(Continued)

(58) Field of Classification Search
CPC . H04L 12/2859; H04L 61/5014; H04L 69/22; H04Q 2011/0064; H04Q 11/0067;
(Continued)

(56) References Cited

U.S. PATENT DOCUMENTS

| | | | | |
|---|---|---|---|---|
| 12,155,574 B2 * | 11/2024 | Hua | ................... | H04L 12/2859 |
| 12,301,381 B2 * | 5/2025 | Peng | ................... | H04W 12/06 |

(Continued)

OTHER PUBLICATIONS

Broadband Forum., "TR-459 Control and User Plane Separation for a Disaggregated BNG," 3GPP, May 14, 2020, pp. 1-103,XP051882750, Retrieved from the Internet: [URL: https://ftp.3gpp.org/tsg_ct/WG4_protocollars_ex-CN4/TSGCT4_98e_meeting/Docs/C4-203064.zip LIAISE-365-WT-459.Rev01.final_ballot-00.pdf] [retrieved on May 14, 2020].

(Continued)

*Primary Examiner* — Angela Widhalm De Rodriguez
(74) *Attorney, Agent, or Firm* — Harrity & Harrity, LLP

(57) ABSTRACT

A first device associated with a physical optical line terminal (pOLT) and a disaggregated broadband network gateway user plane (DBNG-UP) may receive, from a second device associated with an optical network unit (ONU), a first packet associated with a request for network configuration information. The first device may determine, based on the first packet, a circuit identifier associated with a communication link between the first device and the second device, and a remote identifier associated with the second device. The first device may send to a third device associated with a disaggregated broadband network gateway control plane (DBNG-CP), the first packet and additional information that includes the circuit identifier and the remote identifier. The first device may receive from the third device a second packet associated with a response to the request for the network configuration information, and may send the second packet to the second device.

20 Claims, 7 Drawing Sheets

100 ⟶

(51) Int. Cl.
  *H04L 69/22* (2022.01)
  *H04Q 11/00* (2006.01)
(52) U.S. Cl.
  CPC ..... *H04Q 11/0005* (2013.01); *H04Q 11/0067* (2013.01); *H04Q 2011/0064* (2013.01); *H04Q 2011/0073* (2013.01); *H04Q 2011/0079* (2013.01); *H04Q 2011/009* (2013.01)
(58) Field of Classification Search
  CPC ....... H04Q 11/0005; H04Q 2011/0073; H04Q 2011/0079; H04Q 2011/009
  See application file for complete search history.

(56) References Cited

U.S. PATENT DOCUMENTS

| | | | | |
|---|---|---|---|---|
| 2018/0063018 A1* | 3/2018 | Bosch | .................. | H04L 47/822 |
| 2019/0068307 A1* | 2/2019 | Kim | .................... | H04J 14/0245 |
| 2019/0349268 A1* | 11/2019 | Pai | ........................ | H04M 15/00 |
| 2023/0122810 A1* | 4/2023 | Niu | .................... | H04L 12/2861 |
| | | | | 370/389 |
| 2023/0156091 A1* | 5/2023 | Poscic | .................... | H04L 67/141 |
| | | | | 370/254 |
| 2023/0239359 A1* | 7/2023 | Padebettu | ............. | H04L 67/141 |
| | | | | 370/236 |
| 2023/0370938 A1* | 11/2023 | Hua | ...................... | H04W 40/02 |
| 2024/0031196 A1* | 1/2024 | Peng | .................. | H04L 41/5019 |
| 2024/0039763 A1* | 2/2024 | Wan | .................... | H04L 12/2858 |
| 2024/0155705 A1* | 5/2024 | Xu | ........................ | H04W 12/08 |
| 2024/0171652 A1* | 5/2024 | Li | ....................... | H04L 61/5053 |

OTHER PUBLICATIONS

David K., "Overview of PON Developments—Near Term Architectures and Future Evolution Introduction and Overview," CommScope, Nov. 17, 2020, pp. 1-15 [URL:https://angacom.de/fileadmin/Upload/2021/Online_Specials/01_COMMSCOPE_ANGA_presentation_17112020.pdf] [retrieved on Jan. 15, 2024].

Extended European Search Report for Application No. EP23189028 mailed on Jan. 29, 2024, 11 pages.

* cited by examiner

100

Network

DBNG-CP
Device dOLT
Device

102
Receive device
configuration
information pOLT +
DBNG-UP
Device

104
Update
configuration of
the pOLT +
DBNG-UP
device

ONU
Device

200

500

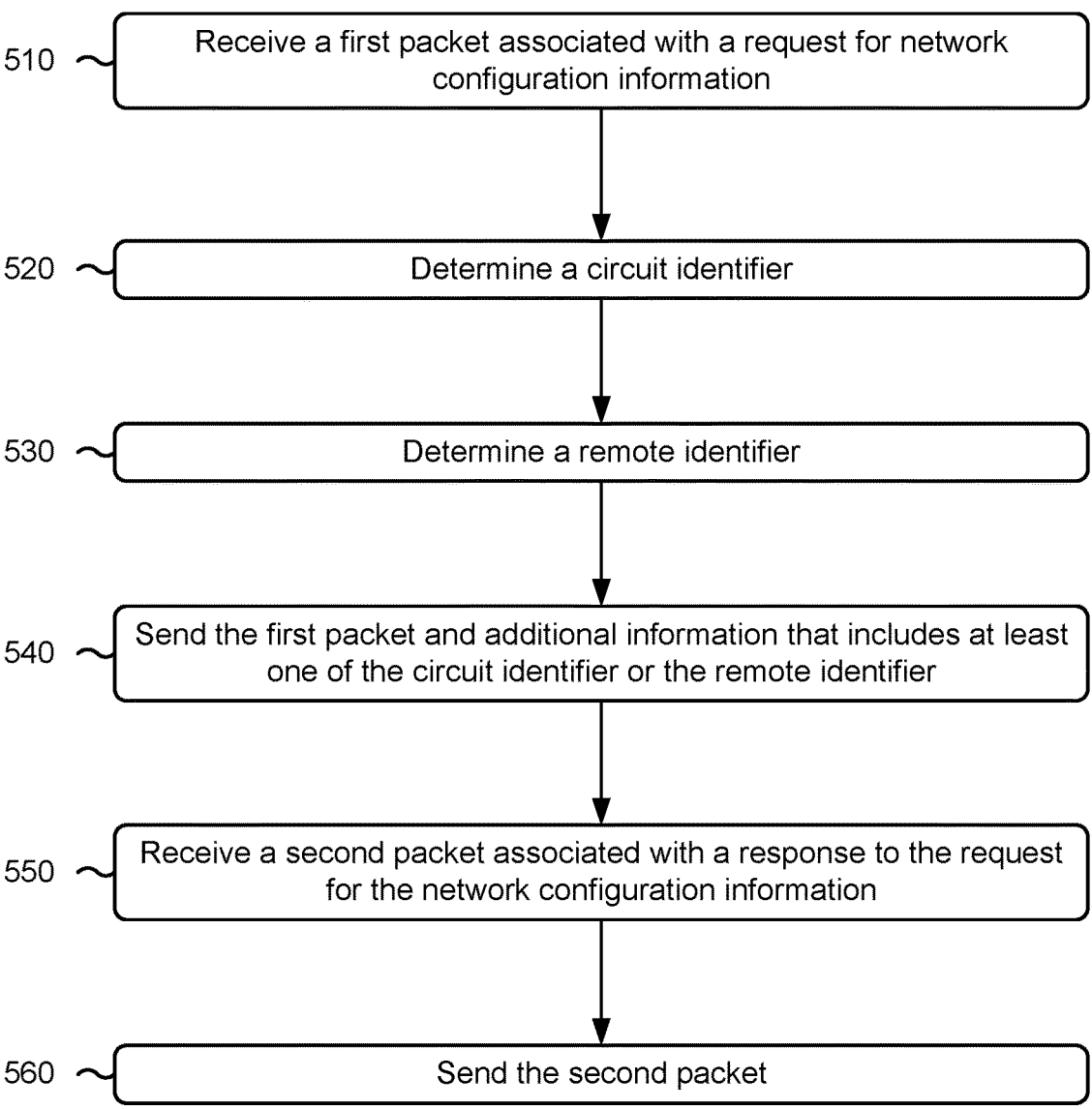

510 — Receive a first packet associated with a request for network configuration information 520 — Determine a circuit identifier 530 — Determine a remote identifier 540 — Send the first packet and additional information that includes at least one of the circuit identifier or the remote identifier 550 — Receive a second packet associated with a response to the request for the network configuration information 560 — Send the second packet

FIG. 5

NETWORK CONFIGURATION INFORMATION PACKET FLOW OPTIMIZATION FOR A DEVICE ASSOCIATED WITH A PHYSICAL OPTICAL LINE TERMINAL (pOLT) AND A DISAGGREGATED BROADBAND NETWORK GATEWAY USER PLANE (DBNG-UP)

BACKGROUND

A broadband network gateway (BNG) routes traffic to and from broadband remote access devices, such as digital subscriber line access multiplexers (DSLAMs), on an Internet service provider (ISP) network. The BNG enables subscribers to connect to the broadband network, and performs authentication, authorization, and accounting; assigns Internet protocol (IP) addresses; and enforces quality of service (QoS) policies, among other examples. A passive optical network (PON) is a fiber-optic telecommunications technology for delivering network access to end users. A PON implements a point-to-multipoint topology, in which a single optical fiber serves multiple endpoints by using unpowered (e.g., passive) fiber optic network devices (e.g., splitters) to divide the fiber bandwidth among multiple access points.

SUMMARY

In some implementations, a method includes receiving, by a first device associated with a physical optical line terminal (pOLT) and a disaggregated broadband network gateway user plane (DBNG-UP), and from a second device associated with an optical network unit (ONU), a first packet associated with a request for network configuration information; determining, by the first device and based on the first packet, a circuit identifier associated with a communication link between the first device and the second device; determining, by the first device and based on the first packet, a remote identifier associated with the second device; sending, by the first device, and to a third device associated with a disaggregated broadband network gateway control plane (DBNG-CP), the first packet and additional information that includes the circuit identifier and the remote identifier; receiving, by the first device, from the third device, and based on sending the first packet and the additional information, a second packet associated with a response to the request for the network configuration information; and sending, by the first device, the second packet to the second device.

In some implementations, a non-transitory computer-readable medium storing a set of instructions includes one or more instructions that, when executed by one or more processors of a first device associated with a pOLT and a DBNG-UP, cause the first device to: receive, from a second device, a first packet associated with a request for network configuration information; determine, based on the first packet, at least one of a circuit identifier or a remote identifier; send, to a third device associated with a DBNG-CP, the first packet and additional information that includes at least one of the circuit identifier or the remote identifier; receive, from the third device, and based on sending the first packet and the additional information, a second packet associated with a response to the request for the network configuration information; and send the second packet to the second device.

In some implementations, a first device associated with a pOLT and a DBNG-UP includes one or more memories; and one or more processors to: determine, based on a first packet that is received from a second device, at least one of a circuit identifier or a remote identifier; send, to a third device associated with a DBNG-CP, the first packet and additional information that includes at least one of the circuit identifier or the remote identifier; receive, from the third device, and based on sending the first packet and the additional information, a second packet; and send the second packet to the second device.

BRIEF DESCRIPTION OF THE DRAWINGS

FIG. 5 is a flowchart of an example process associated with network configuration information packet flow optimization for a device associated with a pOLT and a DBNG-UP.

DETAILED DESCRIPTION

Figure 1A:
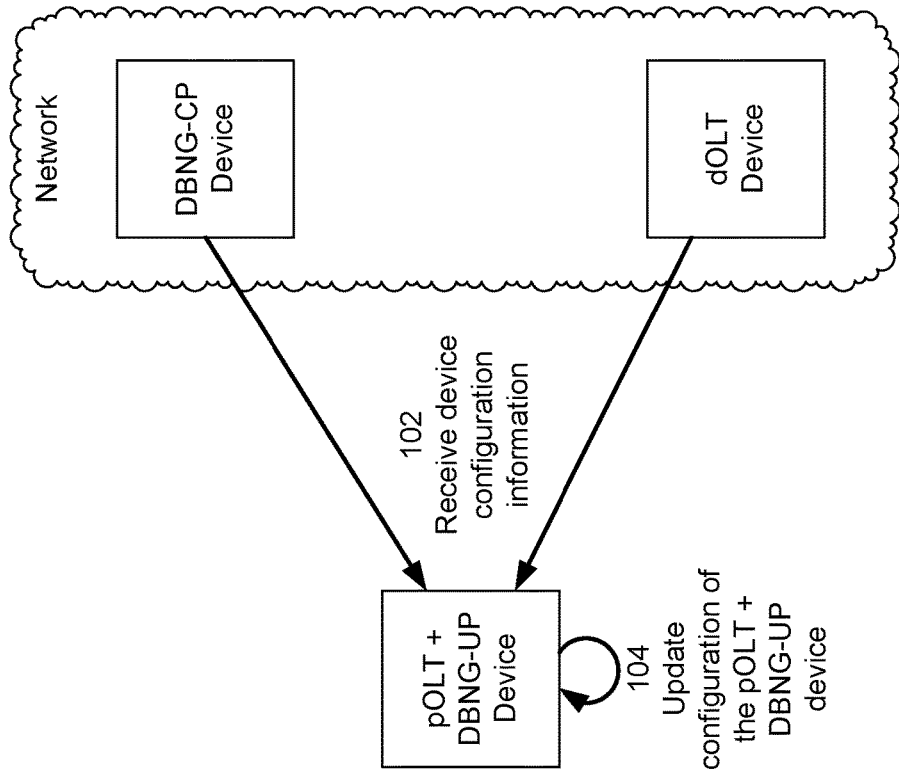
FIGS. 1A-1C are diagrams of an example implementation associated with network configuration information packet flow optimization for a device associated with a pOLT and a DBNG-UP.

The following detailed description of example implementations refers to the accompanying drawings. The same reference numbers in different drawings may identify the same or similar elements.

To accommodate growth in a quantity of subscribers, a quantity and types of services being provided by BNGs, and an amount of traffic being processed by BNGs, a disaggregated BNG (DBNG) may be deployed by a service provider. The DBNG physically and logically separates a control plane and a user plane (also termed a "data plane"). For example, software to perform control plane functions may be distributed for execution by servers as virtualized BNG functions. Devices to implement the user plane, which may include physical network devices or virtual user plane devices, remain in a forwarding path between subscribers and a network to process packet flows according to subscriber forwarding state rules programmed by the control plane. Moreover, the service provider may disaggregate an optical line terminal (OLT) of a PON into a physical OLT (pOLT) and a disaggregated OLT (dOLT), where optical network units (ONUs) (e.g., that are each associated with a subscriber) are physically connected to the pOLT (e.g., via an optical connection). The pOLT supports user plane and access line functions, while the dOLT supports virtualized OLT functions, such as control plane functions.

In some cases, a user plane of a DBNG and a pOLT can be co-located in association with a single device. That is, a single device may implement both a pOLT and a DBNG user plane (DBNG-UP) device (hereinafter referred to as a pOLT+DBNG-UP device), where the pOLT+DBNG-UP device is connected to at least one ONU device and is able to communicate with a dOLT device and a DBNG control plane (DBNG-CP) device. Accordingly, an ONU device (e.g., that is connected to the pOLT+DBNG-UP device) may communicate packets (e.g., point-to-point protocol over Ethernet (PPPoE) packets, dynamic host configuration protocol (DHCP), and/or other packets) with the pOLT+DBNG-UP device to request and obtain network configuration information for the ONU (and/or a device of a subscriber of the ONU). Such packets are sometimes referred to as subscriber control traffic.

However, because a pOLT and a DBNG-UP have different functionalities, and including them in a single device was not originally contemplated, the subscriber control traffic traverses the pOLT+DBNG-UP device multiple times (e.g., to and from the dOLT device and the DBNG-CP device). For example, a first packet to request network configuration information for an ONU device is sent by the ONU to the pOLT+DBNG-UP device, sent by pOLT+DBNG-UP device to the dOLT device to cause the first packet to be modified to include identification information associated with the ONU device, sent back to the pOLT+DBNG-UP device by the dOLT device, and then sent by the pOLT+DBNG-UP device to the DBNG-CP device for authentication. A second packet that responds to the request for network configuration information and includes the identification information is sent by DBNG-CP device to the pOLT+DBNG-UP device, sent by the pOLT+DBNG-UP device to the dOLT device to cause the second packet to be modified to remove the identification information, sent back to the pOLT+DBNG-UP device by the dOLT device, and then sent by the pOLT+DBNG-UP device to the ONU device. This excessive communication with the dOLT to include and remove the identification information requires use of computing resources (e.g., processing resources, memory resources, communication resources, and/or power resources, among other examples) of the pOLT+DBNG-UP device and the dOLT device, and therefore impacts a performance (e.g., a routing performance) of the pOLT+DBNG-UP device and a performance (e.g., a control performance) of the dOLT device.

Some implementations described herein include a pOLT+DBNG-UP device. The pOLT+DBNG-UP device receives, from an ONU device, a first packet associated with a request for network configuration information (e.g., for the ONU device). The pOLT+DBNG-UP device determines at least one of a circuit identifier (e.g., associated with a communication link between the pOLT+DBNG-UP device and the ONU device) or a remote identifier (e.g., associated with the ONU device) and sends, to a DBNG-CP device, the first packet and additional information that includes at least one of the circuit identifier or the remote identifier. For example, the pOLT+DBNG-UP device may include the additional information in a header (e.g., a network service header (NSH)) of the first packet, and may send the first packet (e.g., encapsulated with the header) to the DBNG-CP device. The DBNG-CP device performs an authentication process associated with the first packet (e.g., based on the circuit identifier and/or the remote identifier included in the additional information), and generates and sends, to the pOLT+DBNG-UP device, a second packet associated with a response to the request for the network configuration information. The pOLT+DBNG-UP device then sends the second packet to ONU device.

In this way, some implementations provide network configuration information packet flow optimization (also referred to as subscriber control traffic optimization) for a pOLT+DBNG-UP device. For example, the pOLT+DBNG-UP device does not need to communicate with a dOLT device to determine the circuit identifier or the remote identifier for the first packet, and/or to remove identification information from the second packet. This reduces an amount of computing resources (e.g., processing resources, memory resources, communication resources, and/or power resources, among other examples) that are used by the pOLT+DBNG-UP device to facilitate the flow of network configuration information packets, and reduces a need for the dOLT device to utilize computing resources to facilitate the flow of network configuration information packets. Further, some implementations allow the first packet and the second packet to not be modified (e.g., because the circuit identifier and the remote identifier are included in a header), which safeguards an integrity of the first and second packets, and reduces a use of computing resources of the pOLT+DBNG-UP device and the DBNG-CP device to modify and/or process the packets. This results in an improved performance (e.g., a routing performance) of the pOLT+DBNG-UP device, an improved performance (e.g., a control performance) of the dOLT device, and an improved performance (e.g., a control performance) of the DBNG-CP device.

Figure 1B:
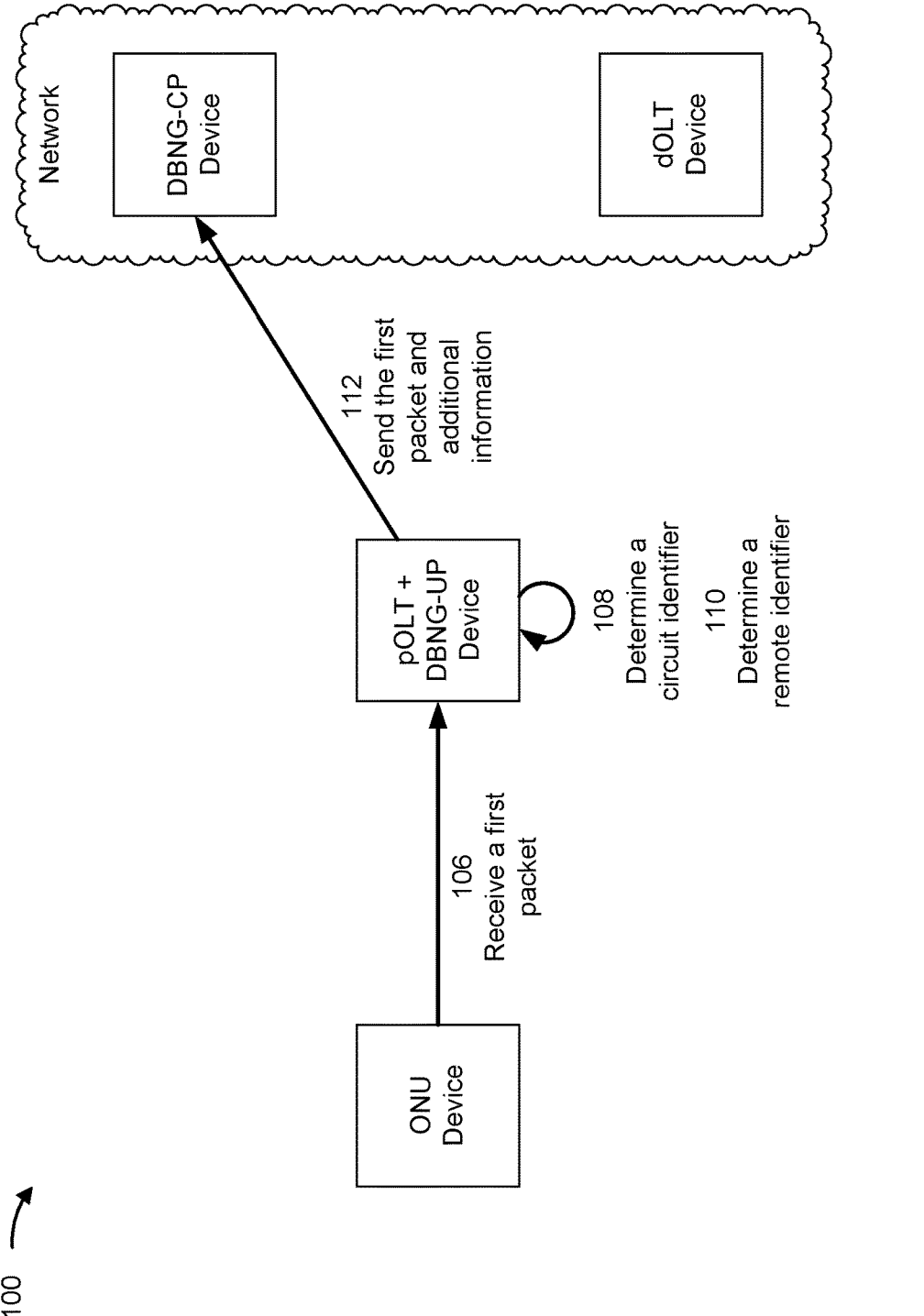
Figure 1C:
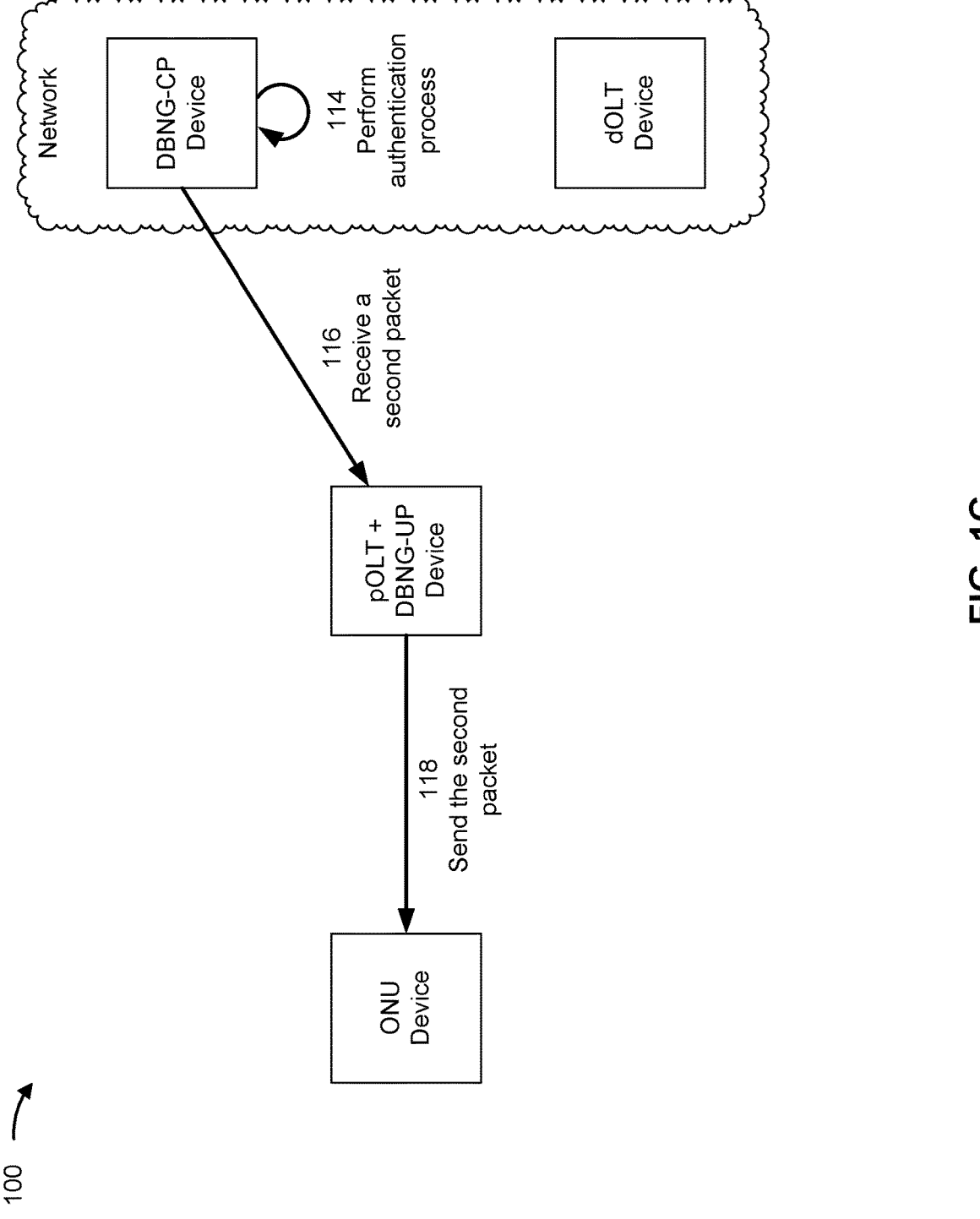

FIGS. 1A-1C are diagrams of an example implementation 100 associated with network configuration information packet flow optimization for a device associated with a pOLT and a DBNG-UP. As shown in FIGS. 1A-1C, example implementation 100 includes a device associated with a pOLT DBNG-UP (hereinafter referred to as a "pOLT+DBNG-UP device"), a device associated with an ONU (hereinafter referred to as an "ONU device"), a device associated with a DBNG-CP (hereinafter referred to as a DBNG-CP device), and a device associated with a dOLT (hereinafter referred to as a dOLT device). These devices are described in more detail below in connection with FIGS. 2-4.

As shown in FIGS. 1A-1C, the ONU device and the pOLT+DBNG-UP device may communicate with each other via a direct connection (e.g., via a direct optical connection). As further shown in FIGS. 1A-1C, the DBNG-CP device and/or the dOLT device may be included in a network (e.g., a "cloud" network), and the pOLT+DBNG-UP device may communicate with the DBNG-CP device and/or the dOLT via the network.

As shown in FIG. 1A, and by reference number 102, the pOLT+DBNG-UP device may receive device configuration information. For example, the DBNG-CP device may send the device configuration information to the pOLT+DBNG-UP device, and the pOLT+DBNG-UP device may thereby receive the device configuration information from the DBNG-CP device. As another example, the dOLT device may send device configuration information to the pOLT+DBNG-UP device, and the pOLT+DBNG-UP device may thereby receive the device configuration information from the dOLT device. A user (e.g., a system administrator) may use a user device to communicate with the DBNG-CP device and/or the dOLT device (e.g., via an interface, such as a command line interface (CLI)) to provide the device configuration information to the DBNG-CP device and/or the dOLT device (e.g., prior to the device configuration information being sent to, and received by, the pOLT+DBNG-UP device). The device configuration information may include information to configure the pOLT+DBNG-UP device, such as to configure the pOLT+DBNG-UP device to perform one or more of the operations described herein in relation to FIGS. 1B-1C. For example, the device configuration information may include information to configure the pOLT+DBNG-UP device to determine at least one of a circuit identifier or a remote identifier (e.g., a circuit identifier alone, a remote identifier alone, or both a circuit identifier and a remote identifier), and/or to send a packet with additional information that includes at least one of the circuit identifier or the remote identifier, as disclosed herein.

Accordingly, as shown by reference number 104, the pOLT+DBNG-UP device may update a configuration of the pOLT+DBNG-UP device (e.g., based on the device configuration information received by the pOLT+DBNG-UP device). For example, the pOLT+DBNG-UP device may process the device configuration information to update one or more configuration parameters of the pOLT+DBNG-UP device. In this way, the pOLT+DBNG-UP device may be configured to perform one or more of the operations described herein in relation to FIGS. 1B-1C. For example, the pOLT+DBNG-UP device (e.g., based on the configuration information) may be configured to determine at least one of a circuit identifier or a remote identifier, and/or to send a packet with additional information that includes at least one of the circuit identifier or the remote identifier, as disclosed herein.

As shown in FIG. 1B, and by reference number 106, the pOLT+DBNG-UP device may receive a first packet. For example, the ONU device may send the first packet to the pOLT+DBNG-UP device, and the pOLT+DBNG-UP device may thereby receive the first packet from the ONU device. The first packet may be associated with a request for network configuration information (e.g., for the ONU device, and/or for another device connected to the ONU device). For example, the first packet may be a PPPoE active discovery initiation (PADI) packet (e.g., that requests network configuration information associated with initiating a PPPoE session). As another example, the first packet may be a DHCP discover packet (e.g., that requests network configuration information associated obtaining an Internet protocol (IP) address).

As shown by reference number 108, the pOLT+DBNG-UP device may determine a circuit identifier (e.g., based on the first packet). The circuit identifier may be associated with a communication link between the pOLT+DBNG-UP device and the ONU device (e.g., a port, an interface, or another communication link of the ONU device on which the first packet was sent; a port, an interface, or another communication link of the pOLT+DBNG-UP device on which the first packet was received; and/or another communication link). For example, the pOLT+DBNG-UP device may identify the communication link between the pOLT+DBNG-UP device and the ONU device and an identifier (e.g., a string of characters comprising letters, numbers, and/or symbols) associated with the communication link. In some implementations, the circuit identifier is the identifier associated with the communication link. In some implementations, the circuit identifier is generated or based on the identifier associated with the communication link (e.g., a hash value or another type of value based on the identifier associated with the communication link).

As shown by reference number 110, the pOLT+DBNG-UP device may determine a remote identifier (e.g., based on the first packet). For example, the pOLT+DBNG-UP device may process (e.g., parse and/or read) the first packet to determine the remote identifier. The remote identifier may be associated with the ONU device. In some implementations, the remote identifier is an identifier associated with the ONU device (e.g., that is indicated by the first packet), such as a media access control (MAC) address or another type of identifier associated with the ONU device. In some implementations, the remote identifier is generated or based on the identifier associated with the ONU device (e.g., a hash value or another type of value based on the identifier associated with the ONU device).

As shown by reference number 112, the pOLT+DBNG-UP device may send the first packet and additional information to the DBNG-CP device. For example, the pOLT+DBNG-UP device may send the first packet and the additional information to the DBNG-CP device, and the DBNG-CP device may thereby receive the first packet and the additional information from the pOLT+DBNG-UP device. The pOLT+DBNG-UP device may send the first packet and the additional information to the DBNG-CP device via a particular interface between the pOLT+DBNG-UP device, such as via a control packet redirect interface (CPRi) between the pOLT+DBNG-UP device and the DBNG-CP device.

The additional information may include, for example, at least one of the circuit identifier or the remote identifier (e.g., the circuit identifier alone, the remote identifier alone, or both the circuit identifier and the remote identifier). In some implementations, the pOLT+DBNG-UP device may generate a header (e.g., for the first packet) that includes at least one of the circuit identifier or the remote identifier, and may send the first packet with the header (e.g., send the first packet encapsulated with the header) to the DBNG-CP device. The header may be, for example, a network service header (NSH), such as the NSH described by TR-459 Section 6.9.3.1. A format of the NSH may be extended to support including the circuit identifier and/or the remote identifier. For example, the NSH may be extended to support a circuit identifier type and/or a remote identifier type.

In some implementations, when the first packet is a PADI packet, the pOLT+DBNG-UP device may include a PPPoE intermediate agent (PPPoE IA) and the DBNG-CP device may include a PPPoE server. Accordingly, the pOLT+DBNG-UP device may use the PPPoE IA to send the first packet and the additional information to the DBNG-CP device (e.g., to the PPPoE server of the DBNG-CP device). Alternatively, when the first packet is a DHCP discover packet, the pOLT+DBNG-UP device may include a DHCP relay agent (DHCP RA) and the DBNG-CP device may include a DHCP server. Accordingly, the pOLT+DBNG-UP device may use the DHCP RA to send the first packet and the additional information to the DBNG-CP device (e.g., to the DHCP server of the DBNG-CP device).

As shown by reference number 114, the DBNG-CP device may perform an authentication process (e.g., based on the first packet and the additional information). For example, the DBNG-CP device may process (e.g., de-encapsulate, parse, and/or read) the first packet and the additional information to identify at least one of the circuit identifier or the remote identifier (e.g., that is included in the additional information, which may be a header of the first packet). Accordingly, the DBNG-CP device may perform an authentication process (e.g., to determine whether the ONU device is authorized to receive the network configuration information requested in the first packet) based on at least one of the circuit identifier or the remote identifier. In some implementations, when the first packet is a PADI packet and the DBNG-CP device includes the PPPoE server, the DBNG-CP device may use the PPPoE server to perform the authentication process. Alternatively, when the first packet is a DHCP discover packet and the DBNG-CP device includes a DHCP server, the DBNG-CP device may use the DHCP server to perform the authentication process.

As a result of the authentication process, the DBNG-CP device may generate a second packet. The second packet may be associated with a response to the request for the network configuration information (e.g., that was included in the first packet). For example, when the first packet is a PADI packet, the DBNG-CP device (e.g., using the PPPoE server) may generate (e.g., when the authentication process is a positive authentication) the second packet as a PPPoE active discovery offer (PADO) packet (e.g., that provides a response to the request for network configuration information associated with initiating a PPPoE session). As another example, when the first packet is a DHCP discover packet, the DBNG-CP device (e.g., using the DHCP server) may generate (e.g., when the authentication process is a positive authentication) the second packet as a DHCP offer packet (e.g., that provides a response to the request for network configuration information associated with obtaining an IP address).

As shown in FIG. 1C, and by reference number 116, the pOLT+DBNG-UP device may receive the second packet. For example, the DBNG-CP device (e.g., using the PPPoE server or the DHCP server) may send the second packet to the pOLT+DBNG-UP device, and the pOLT+DBNG-UP device may thereby receive the second packet. The pOLT+DBNG-UP device may receive the second packet from the DBNG-CP device via a particular interface between the pOLT+DBNG-UP device and the DBNG-CP device, such as the CPRi (e.g., the same interface on which the pOLT+DBNG-UP device sent the first packet and the additional information to the DBNG-CP device) or another interface.

As shown by reference number 118, the pOLT+DBNG-UP device may send the second packet to the ONU device. For example, the pOLT+DBNG-UP device may send the second packet to the ONU device, and the ONU device may thereby receive the second packet from the pOLT+DBNG-UP device.

Accordingly, based on the ONU device receiving the second packet, the ONU device may communicate with the DBNG-CP device via the pOLT+DBNG-UP device, such as to allow the network configuration information to be provided and/or provisioned to the device. For example, the ONU device and the DBNG-CP device may communicate, via the pOLT+DBNG-UP device, one or more additional PPPoE packets (e.g., a PPPoE active discovery request (PADR) packet, a PPPoE active discovery session-confirmation (PADS) packet, and/or another PPPoE packet associated with initiating and/or maintaining a PPPoE session). As another example, the ONU device and the DBNG-CP device may communicate, via the pOLT+DBNG-UP device, one or more additional DHCP packets (e.g., a DHCP request packet, a DHCP acknowledgment packet, and/or another DHCP packet associated with obtaining and/or maintaining an IP address).

As indicated above, FIGS. 1A-1C are provided as an example. Other examples may differ from what is described with regard to FIGS. 1A-1C. The number and arrangement of devices shown in FIGS. 1A-1C are provided as an example. In practice, there may be additional devices, fewer devices, different devices, or differently arranged devices than those shown in FIGS. 1A-1C. Furthermore, two or more devices shown in FIGS. 1A-1C may be implemented within a single device, or a single device shown in FIGS. 1A-1C may be implemented as multiple, distributed devices. Additionally, or alternatively, a set of devices (e.g., one or more devices) shown in FIGS. 1A-1C may perform one or more functions described as being performed by another set of devices shown in FIGS. 1A-1C.

Figure 2:
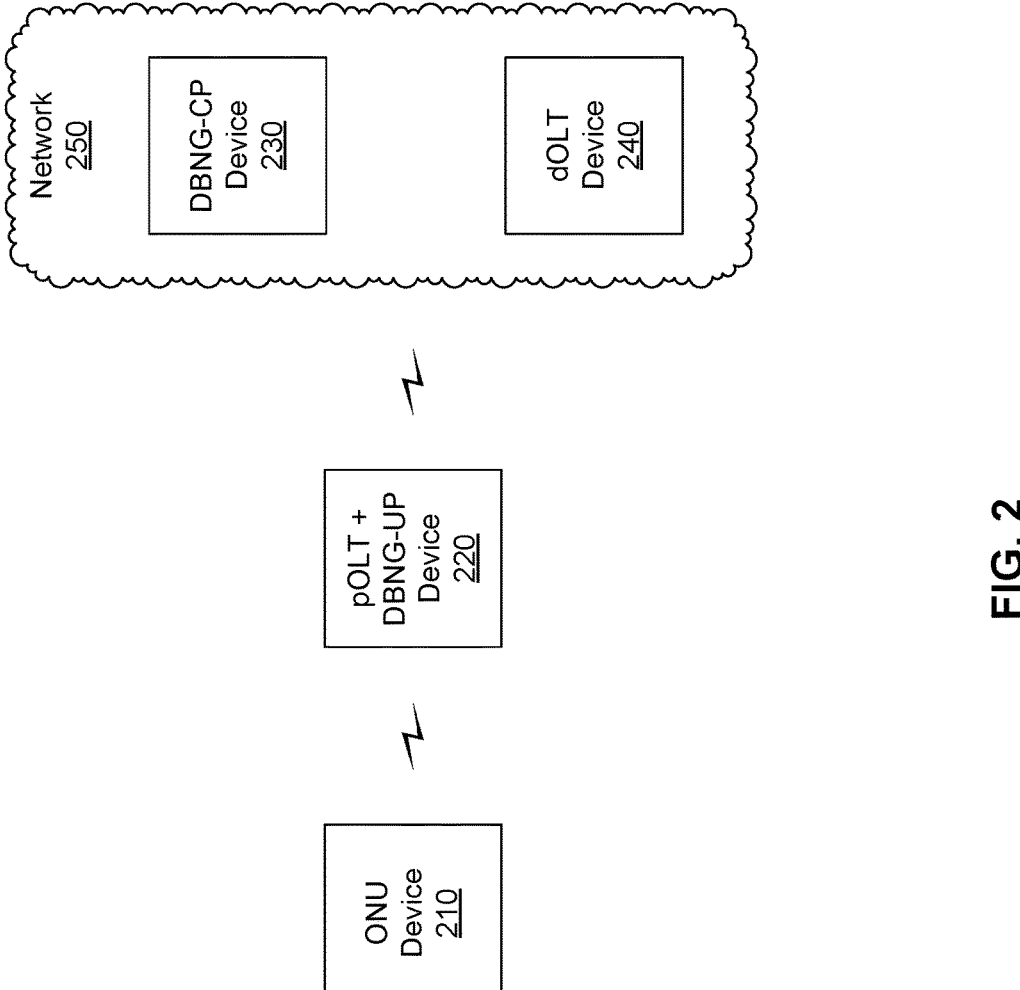
FIG. 2 is a diagram of an example environment in which systems and/or methods described herein may be implemented.

FIG. 2 is a diagram of an example environment 200 in which systems and/or methods described herein may be implemented. As shown in FIG. 2, example environment 200 may include an ONU device 210, a pOLT+DBNG-UP device 220, a DBNG-CP device 230, a dOLT device 240, and/or a network 250. Devices and/or networks of example environment 200 may interconnect via wired connections, wireless connections, or a combination of wired and wireless connections.

The ONU device 210 includes one or more devices capable of receiving, generating, storing, processing, and/or providing information, such as information described herein. For example, the ONU device 210 may include a device that is configured to optically communicate with another optical device, such as the pOLT+DBNG-UP device 220. In some implementations, the ONU device 210 may be able to convert optical signals into electrical signals, and vice versa, to allow a user device (e.g., laptop computer, a tablet computer, a desktop computer, or another type of device) to communicate with the other optical device (e.g., via the ONU device 210). In some implementations, the ONU device 210 may communicate with the pOLT+DBNG-UP device (by communicating one or more PPPoE packets and/or one or more DHCP packets) in association with requesting network configuration information (e.g., for the ONU device 210).

The pOLT+DBNG-UP device 220 includes one or more devices capable of receiving, processing, storing, routing, and/or providing information, such as information described herein. For example, the pOLT+DBNG-UP device 220 may include a router, such as a label switching router (LSR), a label edge router (LER), an ingress router, an egress router, a provider router (e.g., a provider edge router or a provider core router), a virtual router, or another type of router. Additionally, or alternatively, the pOLT+DBNG-UP device 220 may include a gateway, a switch, a firewall, a hub, a bridge, a reverse proxy, a server (e.g., a proxy server, a cloud server, or a data center server), a load balancer, and/or a similar device. In some implementations, the pOLT+DBNG-UP device 220 may include a device that is configured to optically communicate with another optical device, such as the ONU device 210. In some implementations, the pOLT+DBNG-UP device 220 may be able to convert optical signals into electrical signals, and vice versa, to allow the DBNG-CP device 230 and/or the dOLT device 240 to communicate with the other optical device (e.g., via the pOLT+DBNG-UP device 220). In some implementations, the pOLT+DBNG-UP device 220 may be a physical device implemented within a housing, such as a chassis. In some implementations, pOLT+DBNG-UP device 220 may be a virtual device implemented by one or more computing devices of a cloud computing environment or a data center. The pOLT+DBNG-UP device 220 may perform user plane functionality for a DBNG and/or physical OLT functionality for a PON. In some implementations, the pOLT+DBNG-UP device 220 may communicate with the ONU device 210, the DBNG-CP device 230, and/or the dOLT device 240 (by communicating one or more PPPoE packets and/or one or more DHCP packets) in association with requesting network configuration information (e.g., for the ONU device 210).

The DBNG-CP device 230 includes one or more devices capable of receiving, processing, storing, routing, and/or providing information, such as information described herein. For example, the DBNG-CP device 230 may include a router, such as a label switching router (LSR), a label edge router (LER), an ingress router, an egress router, a provider router (e.g., a provider edge router or a provider core router), a virtual router, or another type of router. Additionally, or alternatively, the DBNG-CP device 230 may include a gateway, a switch, a firewall, a hub, a bridge, a reverse proxy, a server (e.g., a proxy server, a cloud server, or a data center server), a load balancer, and/or a similar device. In some implementations, the DBNG-CP device 230 may be a physical device implemented within a housing, such as a chassis. In some implementations, the DBNG-CP device 230 may be a virtual device implemented by one or more computing devices of a cloud computing environment or a data center. The DBNG-CP device 230 may perform control plane functionality for a DBNG. In some implementations, the DBNG-CP device 230 may communicate with the pOLT+DBNG-UP device 220 (by communicating one or more PPPoE packets and/or one or more DHCP packets) in association with requesting network configuration information (e.g., for the ONU device 210).

The dOLT device 240 includes one or more devices capable of receiving, processing, storing, routing, and/or providing information, such as information described herein. For example, the dOLT device 240 may include a router, such as a label switching router (LSR), a label edge router (LER), an ingress router, an egress router, a provider router (e.g., a provider edge router or a provider core router), a virtual router, or another type of router. Additionally, or alternatively, the dOLT device 240 may include a gateway, a switch, a firewall, a hub, a bridge, a reverse proxy, a server (e.g., a proxy server, a cloud server, or a data center server), a load balancer, and/or a similar device. In some implementations, the dOLT device 240 may include a device that is configured to optically communicate with another optical device, such as the pOLT+DBNG-UP device. In some implementations, the dOLT device 240 may be a physical device implemented within a housing, such as a chassis. In some implementations, the dOLT device 240 may be a virtual device implemented by one or more computing devices of a cloud computing environment or a data center. The dOLT device 240 may perform disaggregated OLT functionality (e.g., for a PON). In some implementations, the dOLT device 240 may communicate with the pOLT+DBNG-UP device 220 (by communicating configuration information) in association with requesting network configuration information (e.g., for the ONU device 210).

The network 250 includes one or more wired and/or wireless networks. For example, the network 250 may include a PON, a cellular network (e.g., a fifth generation (5G) network, a fourth generation (4G) network, a long-term evolution (LTE) network, a third generation (3G) network, and/or a code division multiple access (CDMA) network), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
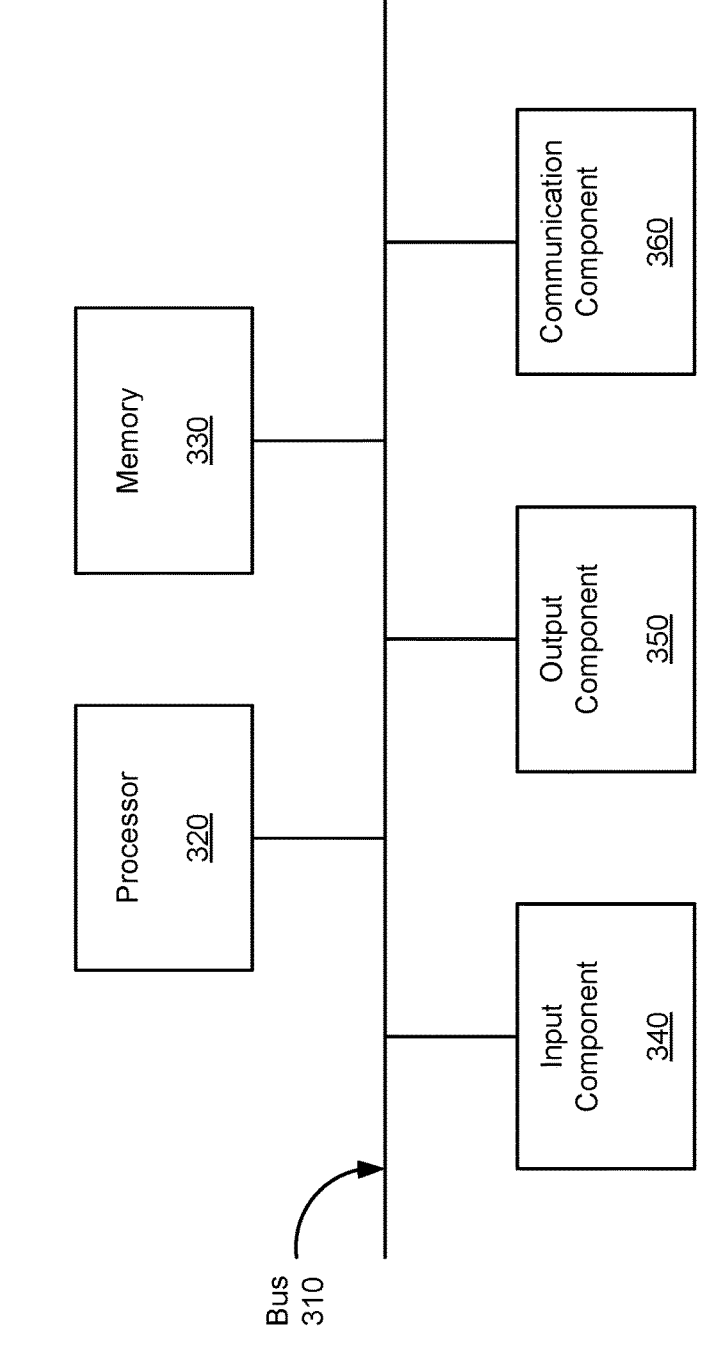
FIG. 3 is a diagram of example components of a device associated with network configuration information packet flow optimization for a device associated with a pOLT and a DBNG-UP.

FIG. 3 is a diagram of example components of a device 300 associated with network configuration information packet flow optimization for a device associated with a pOLT and a DBNG-UP. The device 300 may correspond to the ONU device 210, the pOLT+DBNG-UP device 220, the DBNG-CP device 230, and/or the dOLT device 240. In some implementations, the ONU device 210, the pOLT+DBNG-UP device 220, the DBNG-CP device 230, and/or the dOLT device 240 may include one or more devices 300 and/or one or more components of the device 300. As shown in FIG. 3, the device 300 may include a bus 310, a processor 320, a memory 330, an input component 340, an output component 350, and/or a communication component 360.

The bus 310 may include one or more components that enable wired and/or wireless communication among the components of the device 300. The bus 310 may couple together two or more components of FIG. 3, such as via operative coupling, communicative coupling, electronic coupling, and/or electric coupling. For example, the bus 310 may include an electrical connection (e.g., a wire, a trace, and/or a lead) and/or a wireless bus. The processor 320 may include a central processing unit, a graphics processing unit, a microprocessor, a controller, a microcontroller, a digital signal processor, a field-programmable gate array, an application-specific integrated circuit, and/or another type of processing component. The processor 320 may be implemented in hardware, firmware, or a combination of hardware and software. In some implementations, the processor 320 may include one or more processors capable of being programmed to perform one or more operations or processes described elsewhere herein.

The memory 330 may include volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 may store information, one or more instructions, and/or software (e.g., one or more software applications) related to the operation of the device 300. In some implementations, the memory 330 may include one or more memories that are coupled (e.g., communicatively coupled) to one or more processors (e.g., processor 320), such as via the bus 310. Communicative coupling between a processor 320 and a memory 330 may enable the processor 320 to read and/or process information stored in the memory 330 and/or to store information in the memory 330.

The input component 340 may enable the device 300 to receive input, such as user input and/or sensed input. For example, the input component 340 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 350 may enable the device 300 to provide output, such as via a display, a speaker, and/or a light-emitting diode. The communication component 360 may enable the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
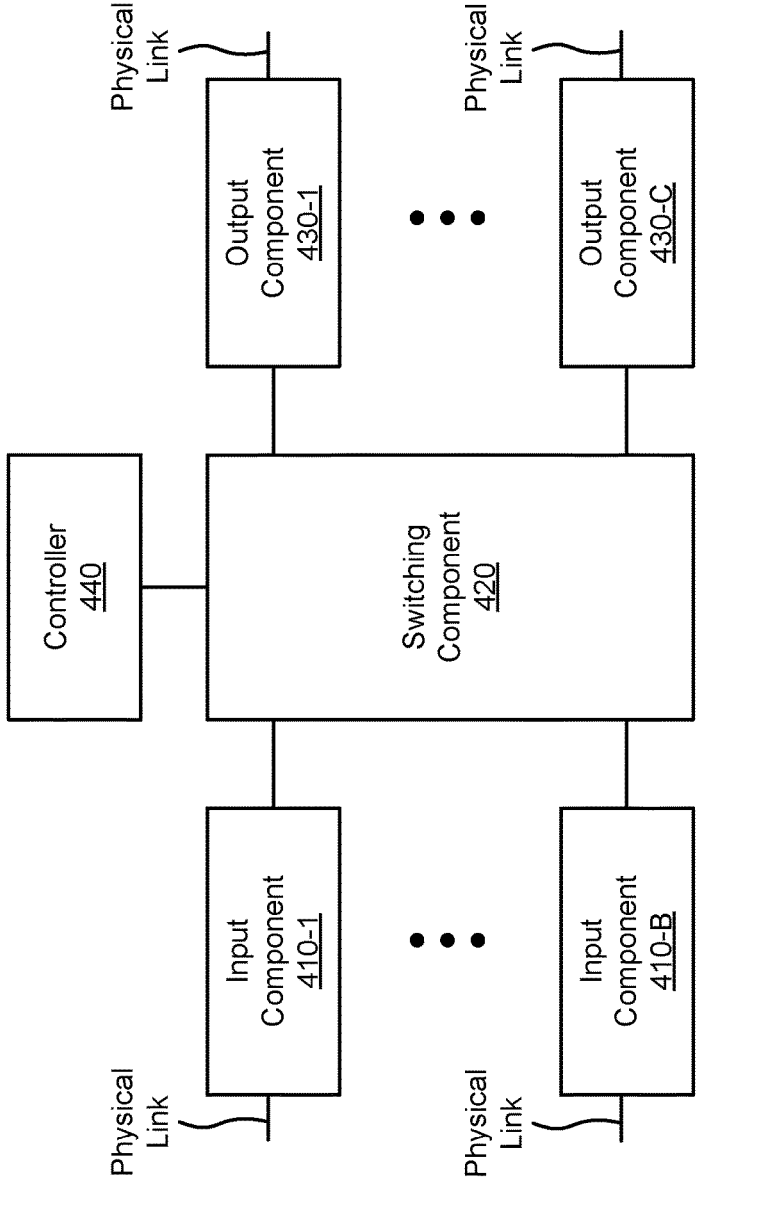
FIG. 4 is a diagram of example components of a device associated with network configuration information packet flow optimization for a device associated with a pOLT and a DBNG-UP.

FIG. 4 is a diagram of example components of a device 400 associated with network configuration information packet flow optimization for a device associated with a pOLT and a DBNG-UP. Device 400 may correspond to the ONU device 210, the pOLT+DBNG-UP device 220, the DBNG-CP device 230, and/or the dOLT device 240. In some implementations, the ONU device 210, the pOLT+DBNG-UP device 220, the DBNG-CP device 230, and/or the dOLT device 240 may include one or more devices 400 and/or one or more components of device 400. As shown in FIG. 4, device 400 may include one or more input components 410-1 through 410-B (B≥1) (hereinafter referred to collectively as input components 410, and individually as input component 410), a switching component 420, one or more output components 430-1 through 430-C (C≥1) (hereinafter referred to collectively as output components 430, and individually as output component 430), and a controller 440.

Input component 410 may be one or more points of attachment for physical links and may be one or more points of entry for incoming traffic, such as packets. Input component 410 may process incoming traffic, such as by performing data link layer encapsulation or decapsulation. In some implementations, input component 410 may transmit and/or receive packets. In some implementations, input component 410 may include an input line card that includes one or more packet processing components (e.g., in the form of integrated circuits), such as one or more interface cards (IFCs), packet forwarding components, line card controller components, input ports, processors, memories, and/or input queues. In some implementations, device 400 may include one or more input components 410.

Switching component 420 may interconnect input components 410 with output components 430. In some implementations, switching component 420 may be implemented via one or more crossbars, via busses, and/or with shared memories. The shared memories may act as temporary buffers to store packets from input components 410 before the packets are eventually scheduled for delivery to output components 430. In some implementations, switching component 420 may enable input components 410, output components 430, and/or controller 440 to communicate with one another.

Output component 430 may store packets and may schedule packets for transmission on output physical links. Output component 430 may support data link layer encapsulation or decapsulation, and/or a variety of higher-level protocols. In some implementations, output component 430 may transmit packets and/or receive packets. In some implementations, output component 430 may include an output line card that includes one or more packet processing components (e.g., in the form of integrated circuits), such as one or more IFCs, packet forwarding components, line card controller components, output ports, processors, memories, and/or output queues. In some implementations, device 400 may include one or more output components 430. In some implementations, input component 410 and output component 430 may be implemented by the same set of components (e.g., and input/output component may be a combination of input component 410 and output component 430).

Controller 440 includes a processor in the form of, for example, a CPU, a graphics processing unit (GPU), an accelerated processing unit (APU), a microprocessor, a microcontroller, a digital signal processor (DSP), a field-programmable gate array (FPGA), an application-specific integrated circuit (ASIC), and/or another type of processor. The processor is implemented in hardware, firmware, or a combination of hardware and software. In some implementations, controller 440 may include one or more processors that can be programmed to perform a function.

In some implementations, controller 440 may include a RAM, a ROM, and/or another type of dynamic or static storage device (e.g., a flash memory, a magnetic memory, an optical memory, etc.) that stores information and/or instructions for use by controller 440.

In some implementations, controller 440 may communicate with other devices, networks, and/or systems connected to device 400 to exchange information regarding network topology. Controller 440 may create routing tables based on the network topology information, may create forwarding tables based on the routing tables, and may forward the forwarding tables to input components 410 and/or output components 430. Input components 410 and/or output components 430 may use the forwarding tables to perform route lookups for incoming and/or outgoing packets.

Controller 440 may perform one or more processes described herein. Controller 440 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 440 from another computer-readable medium or from another device via a communication interface. When executed, software instructions stored in a memory and/or storage component associated with controller 440 may cause controller 440 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

FIG. 5 is a flowchart of an example process 500 associated with network configuration information packet flow optimization for a device associated with a pOLT and a DBNG-UP. In some implementations, one or more process blocks of FIG. 5 are performed by a first device (e.g., the pOLT+DBNG-UP device 220). In some implementations, one or more process blocks of FIG. 5 are performed by another device or a group of devices separate from or including the network device, such as a second device (e.g., the ONU device 210), a third device (e.g., the DBNG-CP device 230), a fourth device (e.g., the dOLT device 240), and/or another network device. Additionally, or alternatively, one or more process blocks of FIG. 5 may be performed by one or more components of device 300, such as processor 320, memory 330, input component 340, output component 350, and/or communication component 360; one or more components of device 400, such as input component 410, switching component 420, output components 430, and/or controller 440; and/or one or more other components.

As shown in FIG. 5, process 500 may include receiving a first packet associated with a request for network configuration information (block 510). For example, the first device may receive, from the second device, a first packet associated with a request for network configuration information, as described above.

As further shown in FIG. 5, process 500 may include determining a circuit identifier (block 520). For example, the first device may determine, based on the first packet, a circuit identifier, as described above. The circuit identifier may be associated with a communication link between the first device and the second device.

As further shown in FIG. 5, process 500 may include determining a remote identifier (block 530). For example, the first device may determine, based on the first packet, a remote identifier associated with the second device, as described above.

As further shown in FIG. 5, process 500 may include sending the first packet and additional information that includes at least one of the circuit identifier or the remote identifier (block 540). For example, the first device may send, to the third device, the first packet and additional information that includes at least one of the circuit identifier or the remote identifier, as described above.

As further shown in FIG. 5, process 500 may include receiving a second packet associated with a response to the request for the network configuration information (block 550). For example, the first device may receive, from the third device, and based on sending the first packet and the additional information, a second packet associated with a response to the request for the network configuration information, as described above.

As further shown in FIG. 5, process 500 may include sending the second packet (block 560). For example, the first device may send the second packet to the second device, as described above.

Process 500 may include additional implementations, such as any single implementation or any combination of implementations described below and/or in connection with one or more other processes described elsewhere herein.

In a first implementation, the first packet is a PADI packet and the second packet is a PADO packet.

In a second implementation, alone or in combination with the first implementation, the first packet is a DHCP discover packet and the second packet is a DHCP offer packet.

In a third implementation, alone or in combination with one or more of the first and second implementations, sending the first packet and the additional information that includes at least one of the circuit identifier or the remote identifier comprises generating a header that includes at least one of the circuit identifier or the remote identifier, and sending the first packet with the header to the third device.

In a fourth implementation, alone or in combination with one or more of the first through third implementations, the header is an NSH.

In a fifth implementation, alone or in combination with one or more of the first through fourth implementations, sending the first packet and the additional information allows the third device to perform an authentication process based on at least one of the circuit identifier or the remote identifier.

In a sixth implementation, alone or in combination with one or more of the first through fifth implementations, the first packet and the additional information are sent to the third device via a CPRi between the first device and the third device, and the second packet is received from the third device via the CPRi.

In a seventh implementation, alone or in combination with one or more of the first through sixth implementations, the first device determines the circuit identifier, determines the remote identifier, and sends the first packet and the additional information based on device configuration information, wherein process 500 further comprises receiving, from the third device and prior to receiving the first packet, the device configuration information.

In an eighth implementation, alone or in combination with one or more of the first through seventh implementations, the first device determines the circuit identifier, determines the remote identifier, and sends the first packet and the additional information based on device configuration information, wherein process 500 further comprises receiving, from the fourth device and prior to receiving the first packet, the device configuration information.

Although FIG. 5 shows example blocks of process 500, in some implementations, process 500 includes additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, traffic or content may include a set of packets. A packet may refer to a communication structure for communicating information, such as a protocol data unit (PDU), a service data unit (SDU), a network packet, a datagram, a segment, a message, a block, a frame (e.g., an Ethernet frame), a portion of any of the above, and/or another type of formatted or unformatted unit of data capable of being transmitted via a network.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   receiving, by a first device associated with a physical optical line terminal (pOLT) and a disaggregated broadband network gateway user plane (DBNG-UP), and from a second device associated with an optical network unit (ONU), a first packet associated with a request for network configuration information;
   determining, by the first device and based on the first packet, a circuit identifier associated with a communication link between the first device and the second device;
   determining, by the first device and based on the first packet, a remote identifier associated with the second device,
      wherein the remote identifier is based on an identifier associated with the ONU;
   sending, by the first device, and to a third device associated with a disaggregated broadband network gateway control plane (DBNG-CP), the first packet and additional information that includes the circuit identifier and the remote identifier;
   receiving, by the first device, from the third device, and based on sending the first packet and the additional information, a second packet associated with a response to the request for the network configuration information; and
   sending, by the first device, the second packet to the second device.

2. The method of claim 1, wherein the first packet is a point-to-point protocol over Ethernet (PPPOE) active discovery initiation (PADI) packet and the second packet is a PPPOE active discovery offer (PADO) packet.

3. The method of claim 1, wherein the first packet is a dynamic host configuration protocol (DHCP) discover packet and the second packet is a DHCP offer packet.

4. The method of claim 1, wherein sending the first packet and the additional information that includes the circuit identifier and the remote identifier comprises:
   generating a header that includes the circuit identifier and the remote identifier; and
   sending the first packet with the header to the third device.

5. The method of claim 4, wherein the header is a network service header (NSH).

6. The method of claim 1, wherein sending the first packet and the additional information allows the third device to perform an authentication process based on the circuit identifier and the remote identifier.

7. The method of claim 1, wherein: the first packet and the additional information are sent to the third device via a control packet redirect interface (CPRi) between the first device and the third device; and
   the second packet is received from the third device via the CPRi.

8. The method of claim 1, wherein the first device determines the circuit identifier, determines the remote identifier, and sends the first packet and the additional information based on device configuration information, wherein the method further comprises:
   receiving, from the third device and prior to receiving the first packet, the device configuration information.

9. The method of claim 1, wherein the first device determines the circuit identifier, determines the remote identifier, and sends the first packet and the additional information based on device configuration information, wherein the method further comprises:
   receiving, from a fourth device associated with a disaggregated optical line terminal (dOLT) and prior to receiving the first packet, the device configuration information.

10. A non-transitory computer-readable medium storing a set of instructions, the set of instructions comprising:
   one or more instructions that, when executed by one or more processors of a first device associated with a physical optical line terminal (pOLT) and a disaggregated broadband network gateway user plane (DBNG-UP), cause the first device to:
      receive, from a second device, a first packet associated with a request for network configuration information;
      determine, based on the first packet, at least one of a circuit identifier or a remote identifier,
         wherein the remote identifier is based on an identifier associated with the second device;
      send, to a third device associated with a disaggregated broadband network gateway control plane (DBNG-CP), the first packet and additional information that includes at least one of the circuit identifier or the remote identifier;
      receive, from the third device, and based on sending the first packet and the additional information, a second packet associated with a response to the request for the network configuration information; and
      send the second packet to the second device.

11. The non-transitory computer-readable medium of claim 10, wherein the first packet is a point-to-point protocol over Ethernet (PPPOE) active discovery initiation (PADI) packet and the second packet is a PPPOE active discovery offer (PADO) packet.

12. The non-transitory computer-readable medium of claim 10, wherein the first packet is a dynamic host configuration protocol (DHCP) discover packet and the second packet is a DHCP offer packet.

13. The non-transitory computer-readable medium of claim 10, wherein the additional information is sent as a header of the first packet.

14. The non-transitory computer-readable medium of claim 13, wherein the header is a network service header (NSH).

15. The non-transitory computer-readable medium of claim 10, wherein sending the first packet and the additional information allows the third device to perform an authentication process based on at least one of the circuit identifier or the remote identifier.

16. The non-transitory computer-readable medium of claim 10, wherein the first device determines at least one of the circuit identifier or the remote identifier based on device configuration information,
    wherein the one or more instructions, when executed by the one or more processors, further cause the first device to:
        receive, from the third device or a fourth device associated with a disaggregated optical line terminal (dOLT), and prior to receiving the first packet, the device configuration information.

17. A first device associated with a physical optical line terminal (pOLT) and a disaggregated broadband network gateway user plane (DBNG-UP), comprising:
    one or more memories; and
    one or more processors to:
        determine, based on a first packet that is received from a second device, at least one of a circuit identifier or a remote identifier,
            wherein the remote identifier is based on an identifier associated with the second device;
        send, to a third device associated with a disaggregated broadband network gateway control plane (DBNG-CP), the first packet and additional information that includes at least one of the circuit identifier or the remote identifier;
        receive, from the third device, and based on sending the first packet and the additional information, a second packet; and
        send the second packet to the second device.

18. The first device of claim 17, wherein the first packet is a point-to-point protocol over Ethernet (PPPOE) active discovery initiation (PADI) packet and the second packet is a PPPOE active discovery offer (PADO) packet.

19. The first device of claim 17, wherein the first packet is a dynamic host configuration protocol (DHCP) discover packet and the second packet is a DHCP offer packet.

20. The first device of claim 17, wherein the additional information is sent as a network service header (NSH) of the first packet.

* * * * *